Nov. 14, 1961

R. W. RANEY 3,008,732

HITCH ASSEMBLY

Filed Sept. 22, 1959

Robert W. Raney
INVENTOR.

BY *Clarence A. O'Brien*
*and Harvey B. Jacobson*
Attorneys

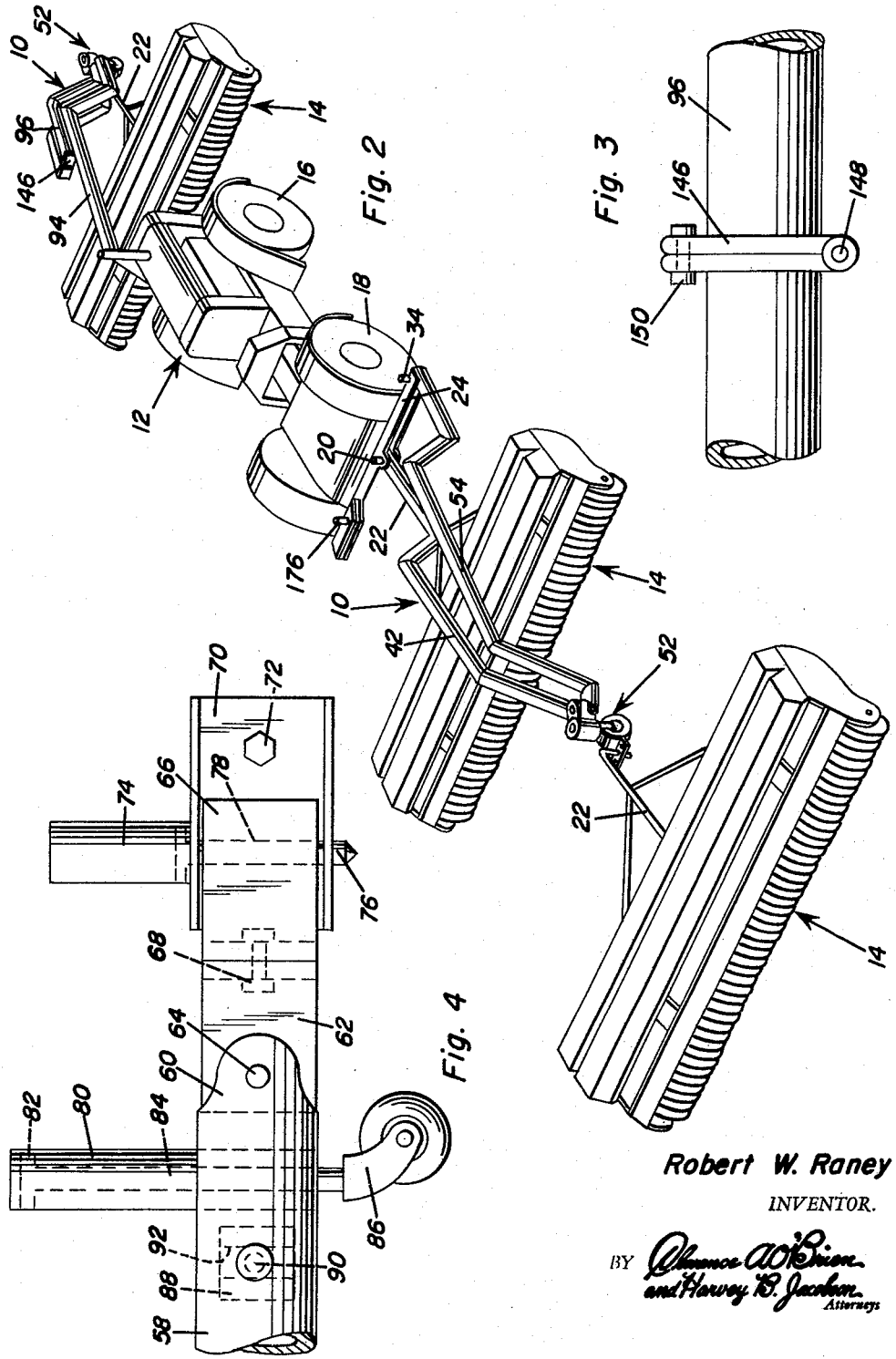

Robert W. Raney
INVENTOR.

Nov. 14, 1961     R. W. RANEY     3,008,732
HITCH ASSEMBLY

Filed Sept. 22, 1959     4 Sheets—Sheet 4

Robert W. Raney
INVENTOR.

United States Patent Office 3,008,732
Patented Nov. 14, 1961

3,008,732
HITCH ASSEMBLY
Robert W. Raney, Drayton, N. Dak.
Filed Sept. 22, 1959, Ser. No. 841,585
5 Claims. (Cl. 280—412)

The present invention generally relates to a hitch assembly and more particularly to such an assembly adapted to be mounted on a tractor or similar prime mover provided with wheels or other ground engaging mechanisms with the hitch assembly being capable of drawing three separate implements in transversely aligned relation behind a tractor or in tandem relation with one of the implements in front of the tractor and two of the implements in trailing relation to the tractor so that the tractor may be employed for readily ransporting the implements on roads, through gates and the like without the necessity of uncoupling the implements from the tractor and loading them on a transport trailer or uncoupling the implements for movement one at a time by using the tractor.

In present day large farming operations, gangs of implements quite often are used. For example three implements such as drills, harrows, disks and the like may be drawn behind a single tractor by a suitable drawbar and hitch arrangement. While the actual work may be accomplished, the field in which the work is to be accomplished quite often has a gate which is relatively narrow and it is also quite often necessary to transport the implements by pulling the implements over roadways by employing the tractor. With the implements arranged transversely behind the tractor, it is impossible to proceed through normal gate openings and also impossible to proceed down roadways since the over-all width of the implements prevents this. Thus, in order to get through a gate or drive the tractor and implements down the roadway, it is necessary to uncouple the implements from the drawbar assembly and either pull one implement at a time or otherwise connect the implements in some manner in a tandem relation. This is time consuming and quite often it requires that a single implement be pulled to the next destination and then the tractor employed for subsequently pulling the other implements singly to the destination. Therefore, it is the primary object of the present invention to provide a hitch assembly which is mounted on the tractor and connected to the three implements so that the three implements may be drawn behind the tractor in generally transversely aligned relation and also oriented in tandem relation to each other and to the tractor with one of the implements leading the tractor and the other implements trailing the tractor with the conversion from one position of the implements to the other position of the implements being controllable from the tractor seat thereby eliminating the necessity of the tractor operator getting off of the tractor and manually uncoupling and coupling the implements so that the combined implements and tractor may be then easily moved through the gate opening, over the road or the like.

Another object of the present invention is to provide a hitch assembly in accordance with the preceding object in which the various coupling elements are hydraulically coupled and uncoupled and the components of the hitch assembly are moved by hydraulically operated piston and cylinder assemblies for moving the hitch assembly to the desired positions.

A further important object of the present invention is to provide a hitch assembly which is easy to attach to tractors, efficient in operation, simple and long lasting, time saving, labor saving and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of the tractor, hitch assembly and implements in longitudinal tandem relation or with the implements in transport position.

FIGURE 3 is a fragmental view illustrating one of the folding joints in that portion of the hitch assembly which swings forwardly of the tractor for moving one of the implements forwardly of the tractor;

FIGURE 4 is a fragmental view illustrating the manner in which a portion of the hitch assembly is connected to the tractor;

Figure 1:
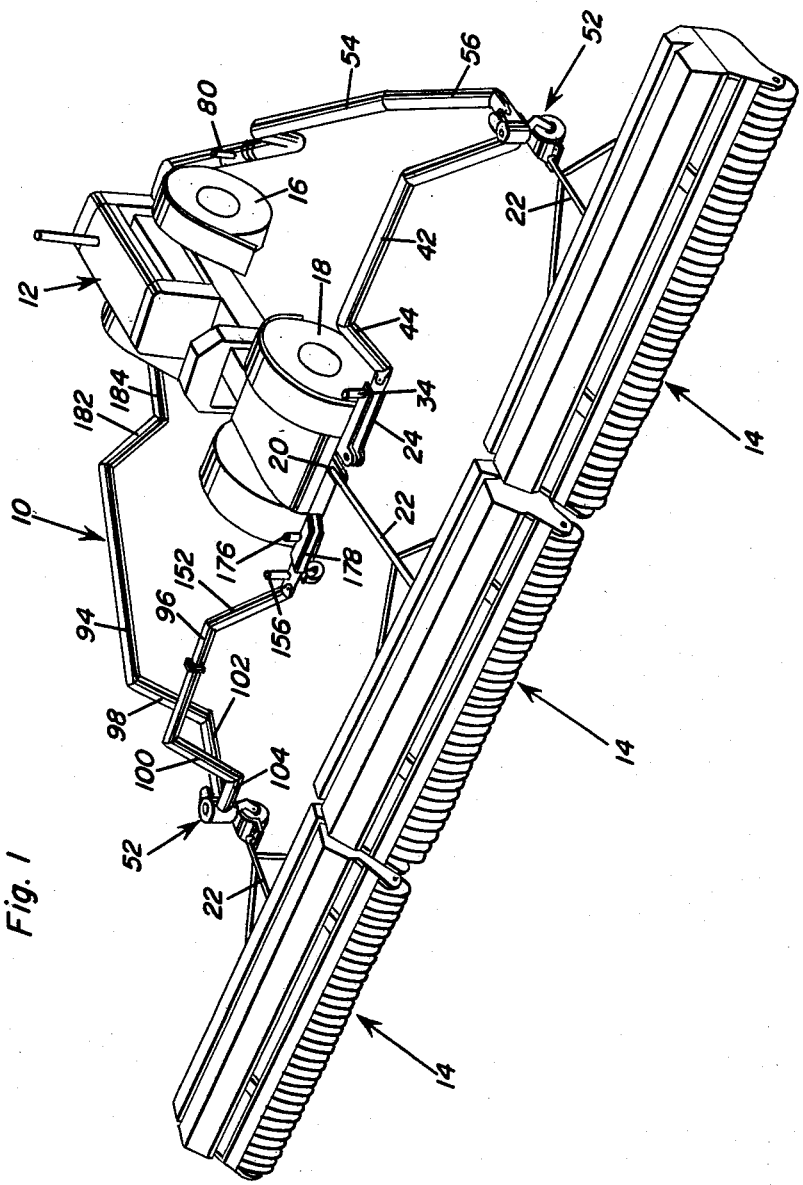
FIGURE 1 is a perspective view illustrating a tractor with the hitch assembly and three implements being drawn behind the tractor in transverse alignment or in working position.

Referring now particularly to the drawings, the numeral 10 generally designates the hitch assembly of the present invention which is illustrated as being attached to a farm tractor 12 and is employed for drawing three implements 14 which for the purposes of illustration are drills but which may be any suitable implement such as harrows, disks, plows or the like. The tractor 12 is of a type known as the farm tractor having the usual front steerable wheels 16 and rear driving wheels 18. The details of the tractor are not important to the invention but it is a necessary requisite that the tractor have a hydraulic pump and system connected therewith. The tractor 12 is also provided with a drawbar 20 on the rear thereof to which the tongue 22 of the central implement 14 is connected in the usual manner so that the implement 14 will always be drawn from the drawbar 20 and will maintain the same position in relation to the tractor 12 when in working position or in transport position. The implement 14 to the right of the tractor when looking at the rear thereof will swing rearwardly and be disposed behind the central implement 14 while the implement 14 to the left of the tractor will swing rearwardly and be disposed forwardly of the tractor 12 when in transport position and in tandem relation to the tractor and the other implement so that all of the implements are in longitudinal alignment so that the width of the implements and the tractor is the same as one of the implements alone rather than the aggregate of the three implements as is the situation when the implements are in working position as shown in FIGURE 1. The transport position of the implements 14 and the orientation of the tractor in relation thereto is illustrated in FIGURE 2 and also, the orientation of the components of the hitch assembly are illustrated in FIGURES 1 and 2 in their working and transport positions respectively.

The implement 14 to the left of the tractor and which is disposed forwardly of the tractor in transport position will hereinafter be called the left implement while the implement 14 to the right of the tractor and disposed behind the tractor and the central implement will hereinafter be called the right implement while the implement connected directly with the tractor will hereinafter be referred to as the central implement. The portions of the hitch assembly which connect to the left implement are entirely separated from the portions of the hitch assembly which connect to the right implement but are connected to the tractor at the forward and rear corners thereof generally speaking. The hitch assembly may be mounted on any type of tractor with the particular details of the brackets being capable of orientation for adaptation to various tractor models. Also, the details of the various hydraulic pressure hoses and control valves are not illustrated since they are of conventional nature and need not be illustrated for a proper understanding of the invention.

Figure 11:
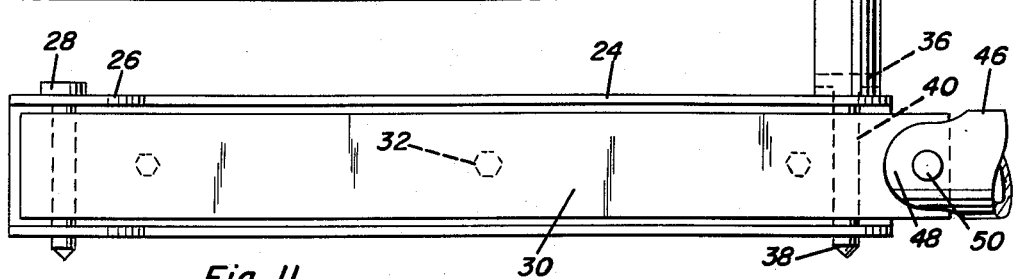
FIGURE 11 is a fragmental elevational view illustrating the right rear tractor attachment and hitch assembly portion connected thereto.

Describing first that part of the hitch assembly 10 connected to the right implement 14, reference is made to FIGURES 4 and 11. In FIGURE 11, there is provided a generally channel shaped bracket 24 that is mounted horizontally and transversely of the rear of the tractor 12 in any suitable manner by any suitable means such as bolts or the like. The inner end of the channel shaped bracket 24 is provided with rearwardly extending lugs 26 which receive a removable pin 28 which forms a pivot pin for connecting the inner end of an arm 30 to the bracket 24. The bolts for mounting the bracket 24 are designated by the numeral 32 and the outer end of the bracket 24 terminates closely adjacent the side extremity of the tractor 12.

Adjacent the outer end of the bracket 24, there is provided a hydraulic cylinder 34 having a piston 36 movably disposed therein with the piston rod 38 connected to the piston 36 being in the form of a pin extending through the rearwardly extending legs of the channel-shaped bracket 24 and also through a vertical bore 40 in the arm 30 thereby detachably connecting the outer end of the arm 30 to the bracket 24 and selectively maintaining the arm 30 received between the upper and lower leg of the channel shaped bracket 24. When the piston 36 is moved upwardly by admitting hydraulic pressure thereunder, the pin or piston rod 38 will be retracted thereby permitting the arm 30 to swing rearwardly about the pivot pin or bolt 28 to a trailing relationship to the tractor which condition is illustrated in FIGURE 2.

Connected to the outer end of the arm 30 is an elongated tubular structural element which may be in the form of a hollow pipe 42 of inverted U-shaped configuration or arched shaped configuration in that the pipe member 42 is provided with a horizontal central portion and depending and outwardly extending end portions 44. The inner end portion 44 terminates in a horizontal extension 46 having projecting ears or lugs 48 thereon which receive therebetween the outer end of the arm 30 and which are pivotally attached thereto by a pin or bolt 50 for permitting swinging movement of the pipe member 42 about a horizontal axis in a vertical plane defined by the pivot bolt 50.

As illustrated in FIGURE 1, the outer end of the pipe 42 is provided with a caster wheel assembly 52 which will be described hereinafter. Connected to the assembly 52 is a forwardly extending pipe section 54 which is also arch shaped and provided with downwardly and outwardly diverging end portions 56.

As illustrated in FIGURE 4, the forward downwardly extending portion 56 terminates in a horizontally extending portion 58 having forwardly extending ears 60 attached to a block 62 by a pin or bolt 64. The block 62 is connected to a block 66 by a swivel bolt 68 and is also connected to a channel shaped bracket 70 held on the tractor at the forward right corner thereof by bolts 72. Mounted on the bracket 70 is a hydraulic piston and cylinder assembly 74 having a depending pin 76 forming the piston rod thereof which extends through the flanges of the bracket 70 and also through a vertical bore 78 in the block 66. At the forward end of the horizontal portion 58, there is also provided a cylinder 80 having a piston 82 therein which is hydraulically operated and the piston rod 84 thereof extends downwardly through the member 58 and terminates in a swivel caster wheel 86 which supports the forward end of pipe member 54 when disconnected from the bracket 72. Also mounted on the member 58 is a swivel bracket 88 projecting inwardly therefrom and being mounted by a removable bolt 90. The bracket 88 is adapted to be received between the upper and lower flanges of the bracket 24 adjacent the end thereof and which is provided with a vertical bore 92 for receiving the pin 38 when in transport position as illustrated in FIGURE 2 thereby retaining the pipe section 54 in position.

The left portion of the hitch assembly connected to the left implement includes pipe sections 94 and 96. The pipe section 94 is provided with downwardly diverging end portions 98 while the pipe section 96 is provided with downwardly diverging end portions 100 each of which terminate in a horizontal extension with the horizontal extensions on pipe section 94 being designated by the numeral 102 and the extensions on pipe section 96 being designated by the numeral 104.

Figure 9:
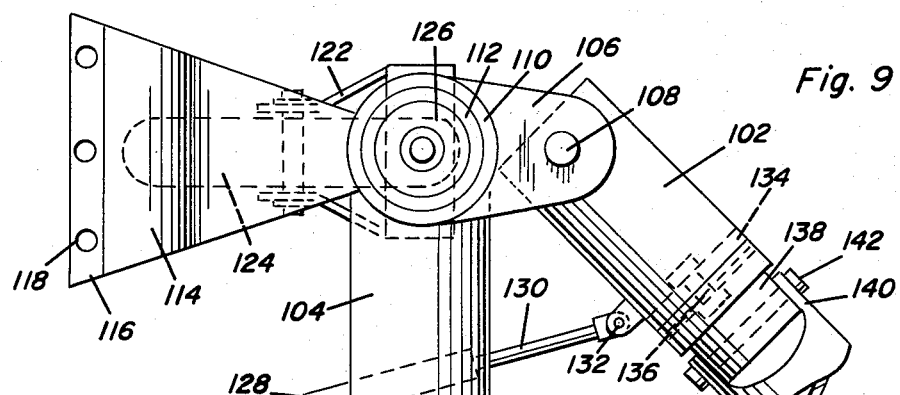
FIGURE 9 is a schematic plan view of the outer corner of the hitch assembly.
Figure 10:
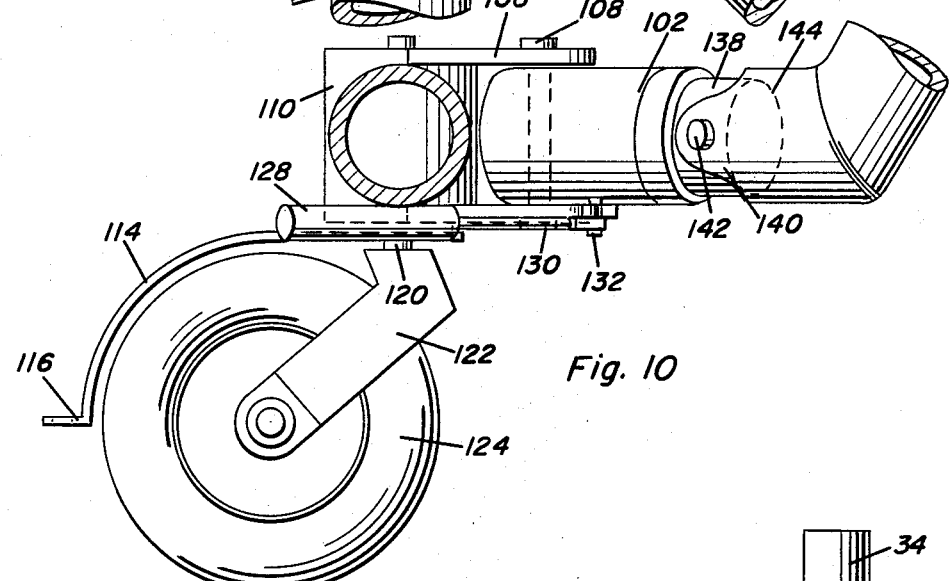
FIGURE 10 is a side elevational view of the construction of FIGURE 9.

Reference is made to FIGURES 9 and 10 which illustrate the connection between the horizontal sections 102 and 104 and this construction will also be the same as the caster wheel assembly generally designated by the numeral 52 in the right portion of the hitch assembly.

The horizontal pipe section 104 is provided with a pair of forwardly projecting horizontal plates 106 which receives therebetween the horizontal section 102. The plates 106 are pivotally connected to the extension 102 by a pivot pin or bolt 108 so that the sections may move in pivotal relationship to each other about the axis of the pin 108. The extension 104 is provided with a short section of vertical pipe 110 to which the plates 106 are also attached and disposed, within the pipe section 110 is a short section of pipe 112 rotatable in relation to the pipe 110. A downwardly curved plate 114 is welded to the lower end of the pipe section 112 so that the plate 114 may swing under the extensions 102 and 104. The rear end of the plate 110 extends rearwardly in a flange 116 and is provided with a plurality of spaced apertures 118 for receiving the downturned end of the tongue 22 to allow for variation in the width of implements used with the hitch. A vertically disposed shaft 120 having a yoke 122 on the lower end thereof supports a caster wheel 124 therein and the shaft 120 is received within a bushing 126 received within the rotatable pipe 112, and the shaft 120 is free to turn 360° within the bushing 126. A piston and cylinder arrangement 128 is mounted under the extension 104 with the piston rod 130 being pivotally connected to the extension 102 by a pivot pin 132 which moves the pipes 94 and 96 together when folding. This is the same structure as the caster wheel assembly 52. Also, the extension 102 is provided with a plate 134 welded therein which receives a bolt 136 and a cylindrical member 138 having a plate in the inner end is attached to the bolt for rotation about the longitudinal axis of the extension 102. A cylindrical member 138 is received between a pair of ears 140 and is pivotally connected thereto by a pin 142 thereby universally connecting the extension 102 to the lower horizontal end portion 144 of the inclined end portion 98 thereby providing an articulate connection for the caster wheel assembly.

The pipe 96 (see FIGS. 1-3) is of a sectional construction and is provided with centrally disposed end plates 146 which are hingedly connected by a hinge member 148 and which may be also provided with a bolt fastener 150 which is optional and may be used during long periods of use of the implement in working position.

Figure 7:
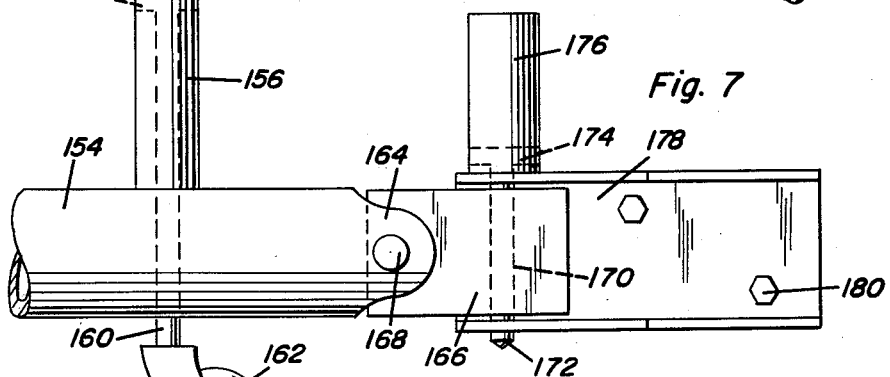
FIGURE 7 is a fragmental side elevation illustrating the structure in which the left rear portion of the hitch assembly is connected to the left rear corner of the tractor.
Figure 8:
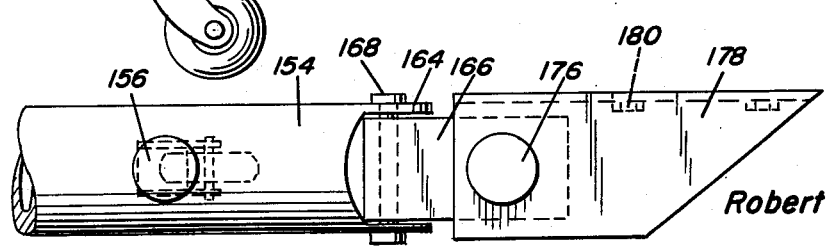
FIGURE 8 is a plan view of the construction of FIGURE 7.

The inner end of the pipe 96 (see FIGS. 7 and 8) is provided with a downwardly extending portion 152 terminating in a horizontally extending portion 154 having a cylinder 156 extending upwardly therefrom and receiving a piston 158 having a piston rod 160 extending downwardly through the extension 154 and terminating in a caster wheel 162 for supporting the free end of the pipe 96 when detached from the tractor. The free end of the extension 154 is provided with a pair of lugs 164 extending longitudinally therefrom for attachment to a block 166 by virtue of a transverse pivot pin or bolt 168 thereby permitting vertical swinging movement of the pipe section 96 about a horizontal axis defined by the pin 168. The block 166 is also provided with a vertical bore 170 therein which receives a vertically movable pin 172 which is actually a piston rod for a piston 174 received within a cylinder 176. The cylinder is mounted on a channel shaped bracket 178 secured to the rear end of the tractor by bolts 180 and the pin 172 extends through the horizontal flanges of the bracket 178 and detachably connects the inner end of the pipe 96 to the tractor.

Figure 5:
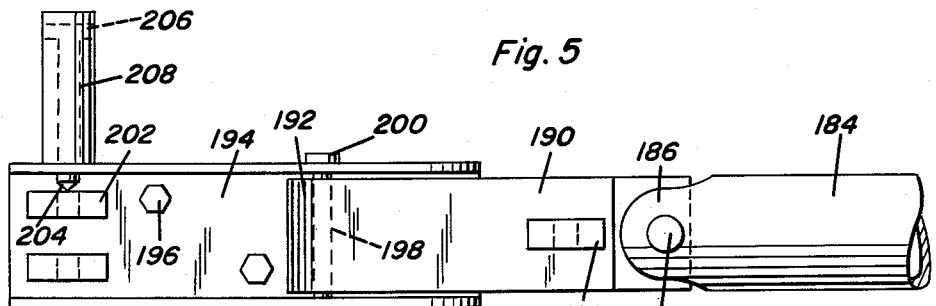
FIGURE 5 is a fragmental side elevation illustrating the portion of the hitch assembly attached to the forward left side of the tractor and which swings forwardly for carrying one of the implements forwardly of the tractor.
Figure 6:
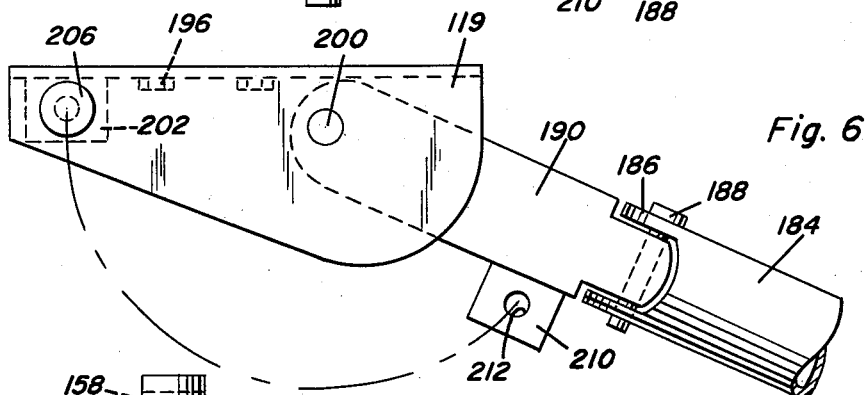
FIGURE 6 is a plan view of the construction of FIGURE 5.

FIGURES 5 and 6 illustrate the bracket for attachment to the left forward end of the tractor for connection to the forward end of the pipe 94 which includes a downwardly inclined portion 182 and a horizontal extension 184 terminating in a pair of longitudinally extending lugs 186 receiving a pivot pin or bolt 188 which also extends through a block 190 thereby pivoting the extension 184 to the block 190. The block 190 has the inner end rounded as designated by the numeral 192 and is received between the upper and lower flanges of the channel shaped bracket 194 secured to the tractor by bolts 196. The forward or inner end of the block 190 is also provided with a bore 198 receiving a pivot pin or bolt 200 extending through the flanges of the bracket 194 and through the end of the block 190 thereby pivotally attaching the block 190 to the tractor for swinging movement about substantially the vertical axis. The pin 188 permits the pipe 94 to ride in a vertical plane so that the caster wheel may follow the terrain over which it passes.

The forward end of the bracket 194 is provided with a pair of projecting apertured lugs 202 which are disposed in vertically spaced relation with the apertures therein being in vertical alignment for receiving a pin 204 which is actually a piston rod connected to a piston 206 received within a cylinder 208 whereby hydraulic pressure may be employed for inserting the pin 204 through the apertured lugs 202. The block 190 is provided with a lug 210 having an aperture or bolt 212 extending therethrough which projection or lug 210 is adapted to be received between the lugs 202 with the apertures all being in alignment for receiving the pin 204 whereby the block 190 will be locked in position extending alongside and forwardly of the bracket 194 thereby retaining the pipe section 94 in forwardly extending relation to the tractor.

It is pointed out that the arched shaped construction of the pipe sections permit the pipe sections to extend over the implements and otherwise permit the movement of the pipes to the desired positions for the working position and the transport position.

When the device is to be used in working position, the components will be orientated as illustrated in FIGURE 1. When desired to convert the implements to their transport position, the control valves operated by the operator of the tractor will be employed for lowering the caster wheel 162 on the inner end of the pipe 96 and then the pin 172 should be retracted thus disconnecting the inner end of the pipe 96 from the tractor. The tractor should then be backed up a few feet and arm or pipe 96 is swung against pipe 94 by employing the piston and cylinder arrangement 128 (see FIG. 9) at the juncture thereof. The pipe 96 is also folded in the middle on the hinge. The caster wheel 86 (see FIG. 4) is lowered in relation to the forward end of the pipe 54 and the pin 76 is removed by retracting it. At the same time, the pin 38 (see FIG. 11) is lifted thus releasing the arm 30 so that it may swing about the pivot pin 28. Then by turning the tractor to the left and driving slowly forward, arms or pipes 94 and 96 with the left implement attached thereto will swing in front of the tractor with the implement travelling under the arms or pipes 94 and 96. The pipes 42 and 54 connected to the right implement will swing to the back with the right implement going behind the center implement with the pipes extending over the center implement thus pulling the right implement behind the tractor and the center implement. In order to lock the transport in travelling position, the arms 54 and 42 are locked by the pin 38 being inserted through a hole in the swivel bracket 88 (FIG. 4) at the front end of the pipe 54. The arms 94 and 96 are held in position by the pin 204 being inserted through the lugs 202 and 210 which are in alignment when the left implement is in position in front of the tractor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a tractor having a drawbar, a central implement disposed behind the tractor, a left implement and a right implement disposed alongside of the central implement and extending laterally of the path of movement of the tractor, means interconnecting the left implement and the tractor, and means interconnecting the right implement and the tractor, said means interconnecting the implements and tractor being capable of reorientation in relation to the tractor whereby the left implement is maintained forwardly of the tractor and the right implement maintained rearwardly of the central implement, said means interconnecting the right implement and the tractor including a rearwardly extending arm having its forward end pivotally and detachably connected to the forward right end of a tractor, a supporting caster for the forward end of said arm, an outwardly extending arm pivotally connected to the rear of the tractor at its inner end and pivotally connected to the rearwardly extending arm at its outer end adjacent the point of attachment of the right implement to the rearwardly extending arm, and a caster wheel supporting the juncture between the arms.

2. The structure as defined in claim 1 wherein the rearwardly extending arm is provided with means at the forward end thereof for connection with the rear end of the tractor when both of said arms are disposed in trailing relation to the tractor, said arms being arch shaped in configuration for overlying the central implement and connecting the right implement behind the central implement.

3. In combination with a tractor having a drawbar, a central implement disposed behind the tractor, a left implement and a right implement disposed alongside of the central implement and extending laterally of the path of movement of the tractor, means interconnecting the left implement and the tractor, and means interconnecting the right implement and the tractor, said means interconnecting the implements and tractor being capable of reorientation in relation to the tractor whereby the left implement is maintained forwardly of the tractor and the right implement maintained rearwardly of the central implement, said means interconnecting the left implement and the tractor including a rearwardly extending arm having its forward end pivotally attached to the tractor adjacent the forward end thereof, an outwardly extending arm having its inner end detachably connected to the rear end of the tractor and its outer end pivotally connected to the rear end of the rearwardly extending arm, a caster supporting the outer ends of the arms, and means interconnecting the tractor and rearwardly extending arm for locking the arms in forwardly swung position when the inner end of the outwardly extending arm is released and the arms swing forwardly thereby maintaining the arms disposed forwardly of the tractor.

4. The combination of claim 3 wherein the outwardly extending arm is constructed of two hingedly interconnected sections so that the sections of the outwardly extending arm may be folded alongside of each other and alongside the elongated rearwardly extending arm for swinging to a position extending forwardly of the vehicle.

5. In combination with a tractor type vehicle having a transverse rear drawbar, a central implement articulately connected to the drawbar, a left implement disposed alongside of and to the left of the central implement, a right implement disposed alongside of and to the right of the central implement, means interconnecting the left implement and the tractor for retaining the left implement alongside the central implement in working position, said means including arms for retaining the left implement in front of the tractor in transport position when the arms have been secured in transport position, means interconnecting the right implement and the tractor for retaining the right implement alongside of and to the right of said central implement in working position, said last named means including arms for retaining the right implement in trailing relation to the central implement and the tractor in transport position when the arms have been secured in transport position.

References Cited in the file of this patent

UNITED STATES PATENTS

| | | |
|---|---|---|
| 1,628,038 | Draper | May 10, 1927 |
| 2,178,467 | Brent | Oct. 31, 1939 |
| 2,606,417 | Richey | Aug. 12, 1952 |
| 2,716,854 | Scheibner | Sept. 6, 1955 |